United States Patent [19]
Brown

[11] Patent Number: 5,071,165
[45] Date of Patent: Dec. 10, 1991

[54] EMERGENCY LOCK FOR PASSIVE SEAT BELT SYSTEM

[75] Inventor: Louis R. Brown, Oxford, Mich.

[73] Assignee: TRW Vehicle Safety Systems Inc., Lyndhurst, Ohio

[21] Appl. No.: 514,511

[22] Filed: Apr. 25, 1990

[51] Int. Cl.⁵ ............................................. B60R 22/06
[52] U.S. Cl. ..................................... 280/804; 297/469
[58] Field of Search ....................... 280/802, 804, 806; 297/469

[56] References Cited

U.S. PATENT DOCUMENTS

| | | | |
|---|---|---|---|
| 4,302,031 | 11/1981 | Nishimura et al. | 280/804 |
| 4,325,569 | 4/1982 | Suzuki et al. | 280/804 |
| 4,345,781 | 8/1982 | Suzuki et al. | 280/802 |
| 4,354,696 | 10/1982 | Volk et al. | 280/804 |
| 4,436,323 | 3/1984 | Yamamoto | 280/804 |
| 4,730,845 | 3/1988 | Betencourt | 280/804 |
| 4,840,405 | 6/1989 | Escaravage | 280/804 |

Primary Examiner—Richard A. Bertsch

[57] ABSTRACT

A emergency lock for a passive seat belt system restrains the seat belt anchor in a secured rear position in emergency situations. A pivotal lock bar which blocks movement of the anchor in a forward direction along a track member independently of a driven tape is mounted and contained entirely within the track member.

14 Claims, 4 Drawing Sheets

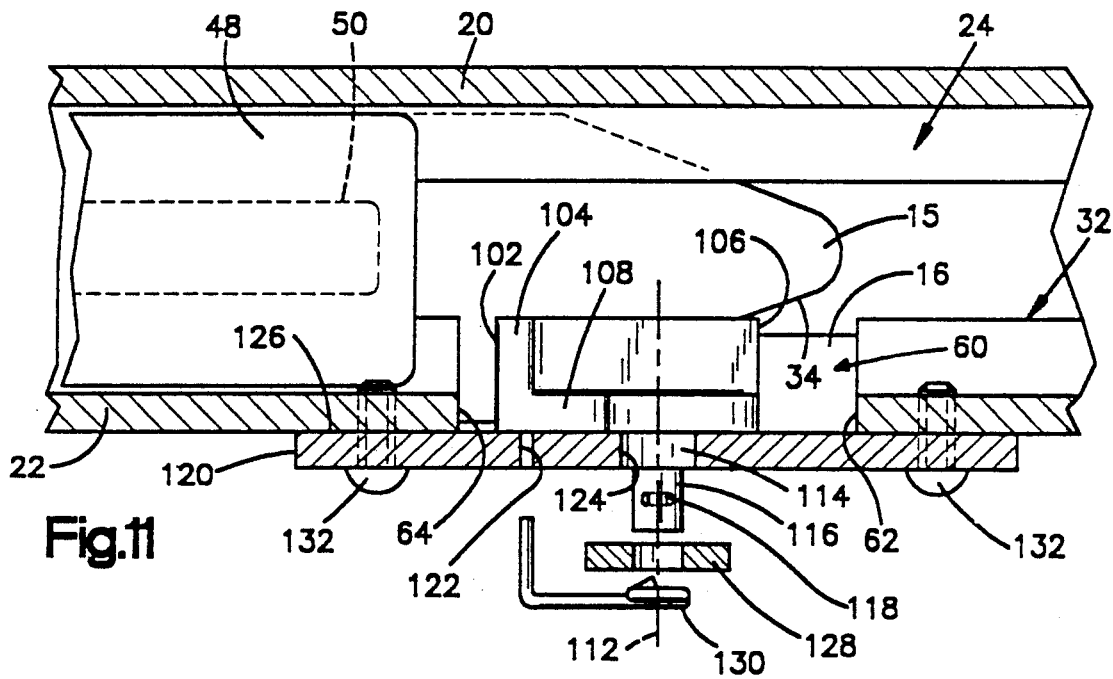
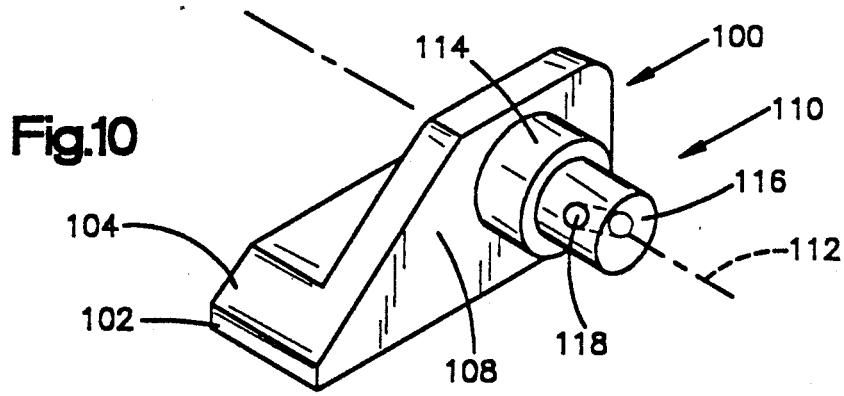
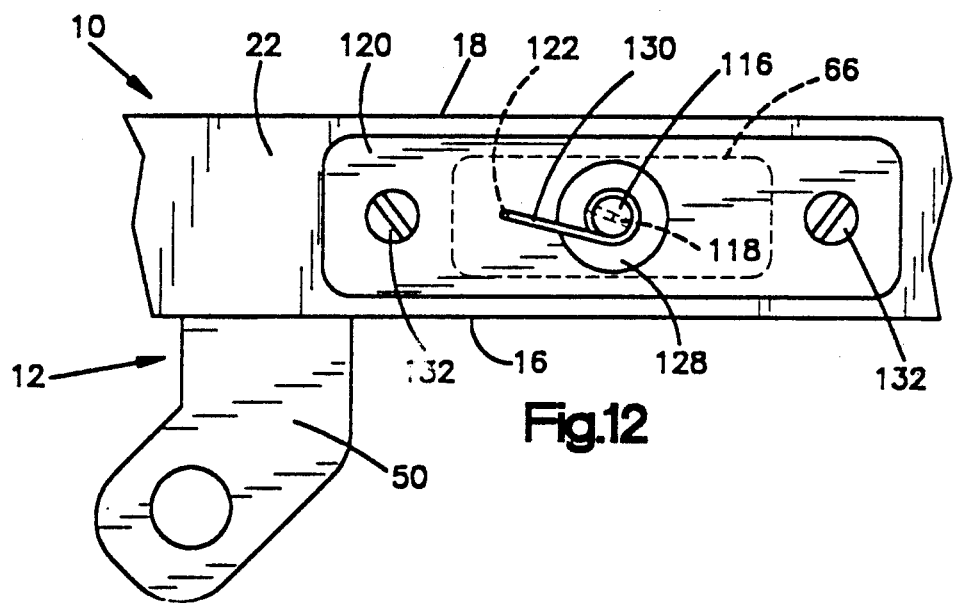

EMERGENCY LOCK FOR PASSIVE SEAT BELT SYSTEM

FIELD OF THE INVENTION

The present invention relates to the art of locks for passive seat belt systems, and particularly to a lock which restrains a seat belt in a position secured about a vehicle occupant in emergency situations.

BACKGROUND OF THE INVENTION

Passive seat belt systems include a seat belt and means for automatically moving the seat belt into position about a vehicle occupant without manipulation by the occupant. Such systems generally comprise a track extending adjacent to the vehicle door from a forward position to a rear position adjacent to the back of the seat, and a seat belt anchor which is slidable in the track. The seat belt anchor is connected to a flexible tape which is driven to cycle the anchor between the forward and rear positions. A shoulder belt attached to the anchor is thereby driven between an open position forward of the seat and a secured position to the rear of the seat. An emergency lock is normally associated with the rear end of the track to retain the seat belt anchor in the secured position in an emergency.

Various types of emergency locks for passive seat belt systems are known. For example, U.S. Pat. No. 4,345,781 shows a passive seat belt system wherein an emergency lock housing is mounted to the side of the track between the forward and rear ends of the track. A pair of pivotal arms are spring biased together to extend partially from the lock housing into the track, with one arm in the path of movement of the driven tape and the other arm in the path of movement of the seat belt anchor carried with the tape. The two pivotal arms are arranged such that the seat belt anchor cannot move forward past the lock housing unless a lost motion clearance between the anchor and the tape allows the driven tape first to move the associated pivotal arm out of its path of movement. That pivotal arm simultaneously moves the other pivotal arm out of the path of the anchor.

This type of lock functions effectively in emergency situations, but suffers from disadvantages associated with the lock housing. The housing must be large enough to contain both pivotal arms, as well as a spring and a pivot bar which connects the two arms for movement together about the pivot bar axis. The housing is located outside the track to one lateral side thereof to receive the pivotal arms when not in the locking position. This arrangement complicates the structure and configuration of the passive seat belt system. Furthermore, the locking components of a passive seat belt system are contained within the structure of the B-pillar of the vehicle at the outboard side of the seat. The housing outside of the sliding track consumes valuable space in the B-pillar structure and presents an obstacle to vehicle designs which call for a reduction in size.

Another emergency lock for a passive seat belt system is shown in U.S. Pat. No. 4,302,031 wherein a locking mechanism is mounted in a housing located at the rear end of the track. A tape extends beyond the end of the track through the housing to a driving motor, and a seat belt anchor carried on the tape is blocked from movement beyond the end of the track by a stop surface on the housing. A spring biased locking lever is pivotally mounted to the housing with a locking end thereof extending outside of the housing, and a releasing end extending inside the housing in line with the terminal end of the track. The locking end of the lever engages an external member of the seat belt anchor when the tape carries the anchor and an attached belt into a secured position at the end of the track. The releasing end of the lever is engaged by a release block carried on the tape to pivot the locking end out of engagement with the seat belt anchor when the tape is driven back in the opposite direction through a lost motion clearance with the seat belt anchor. This type of lock functions effectively, but also suffers from the disadvantage of presenting a structure which is complicated and which consumes valuable space outside of the sliding track.

SUMMARY OF THE INVENTION

The present invention provides an emergency lock for a passenger seat belt system which does not obtrusively consume the limited space available outside of a sliding track.

In accordance with the invention, a passive seat belt system comprises a track with a longitudinally extending channel, and a slider movable through the channel and having means for attachment to a seat belt. Emergency locking means includes a lock bar which is shiftable between a first position extending into the path of movement of the slider through the channel, and a second position not extending into the path of movement of the slider. Means are provided to mount the lock bar entirely within the track when in the second position. The invention thereby overcomes the disadvantages of prior art emergency locks which require separate housing structures for the locking bars at locations outside of the track.

In accordance with a preferred embodiment of the invention, the lock bar is mounted entirely within the track when in both the first and second positions. The mounting means includes a mounting support hub within the track. The lock bar has first and second end sections, and is pivotally mounted on the hub at an intermediate section of the lock bar between the end sections. The lock bar extends longitudinally along the track with the end sections of the lock bar located within the track. In this arrangement, the lock bar advantageously does not consume any space outside of the track.

In accordance with specific features of the invention, the lock bar has, when in the first position, the first end section extending into the path of movement of the slider and the second end section extending into the path of movement of a tape which drives the slider along the track. The lock bar is biased toward the first position. The tape includes a tapered edge portion for engagement with the second end section of the lock bar to move the lock bar into the second position. Use of a tapered edge portion of the tape itself to move the lock bar reduces the size and complexity of the lock assembly as compared to prior art lock assemblies requiring separate release blocks carried on the tape to move a longitudinally extending lock bar out of a locked position.

In accordance with other features of the present invention, the channel includes a slider guide portion and a tape guide portion. The slider guide portion of the channel includes a shoe receiving passageway and a slot communicating the shoe receiving passageway with the exterior of the track. The slider has a shoe movable through the shoe receiving passageway and an extension movable through the slot. An internal locking region is provided within the track to communicate the shoe receiving passageway and the tape guide portion of the channel. The lock bar is mounted in the internal locking region of the track with the first end section of the lock bar extending into the shoe receiving passageway, and the second end section of the lock bar extending into the tape guide portion of the channel when the lock bar is in the first position. This arrangement of an internal locking region of the track enables the lock bar to be mounted and contained entirely within the track without requiring the track to exceed the size required only to contain the channel for the slider and the tape.

Further features of the invention include an opening in a side wall of the track to provide access to the internal locking region, and a closure wall releasably securable over the opening, such as with machine screws or the like. The mounting support hub for the lock bar is attached to the closure wall, and the biasing means includes a spring acting between the closure wall and the lock bar. This arrangement advantageously provides a simplified structure for an emergency lock assembly whereby the lock bar and spring can be assembled with the closure wall separately from the track, and can be mounted in the track, as well as removed from the track, simply by means of releasable attachment of the closure wall over the access opening.

DESCRIPTION OF THE DRAWINGS

Further features of the present invention will be apparent to those skilled in the art upon reading the following detailed description of the invention with reference to the accompanying drawings wherein:

FIG. 10 is a perspective view of an alternate lock bar in accordance with the present invention;

FIG. 11 is a sectional view of a passive seat belt system in accordance with an alternate embodiment of the present invention; and FIG. 12 is a side view of the passive seat belt system of FIG. 11 in an assembled condition.

DESCRIPTION OF THE PREFERRED EMBODIMENTS

Figure 1:
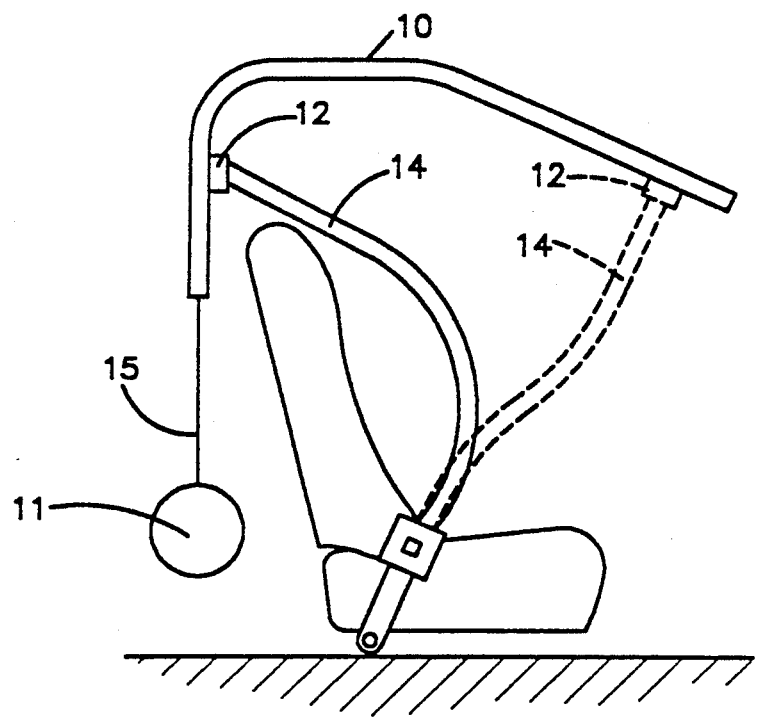
FIG. 1 is a schematic view of the interior of a motor vehicle having a passive seat belt system with emergency locking means in accordance with the present invention.

In FIG. 1 there is shown a passive seat belt system comprising an elongated track 10, a slider 12 which is movable along the length of the track 10, and a seat belt 14 anchored to the slider 12. A flexible tape 15 is connected to the slider 12 and is driven through the track 10 by a motor 11 to carry the slider 12 and the seat belt 14 between an open forward position shown in dotted lines and a secured rear position shown in solid lines.

Figure 3:
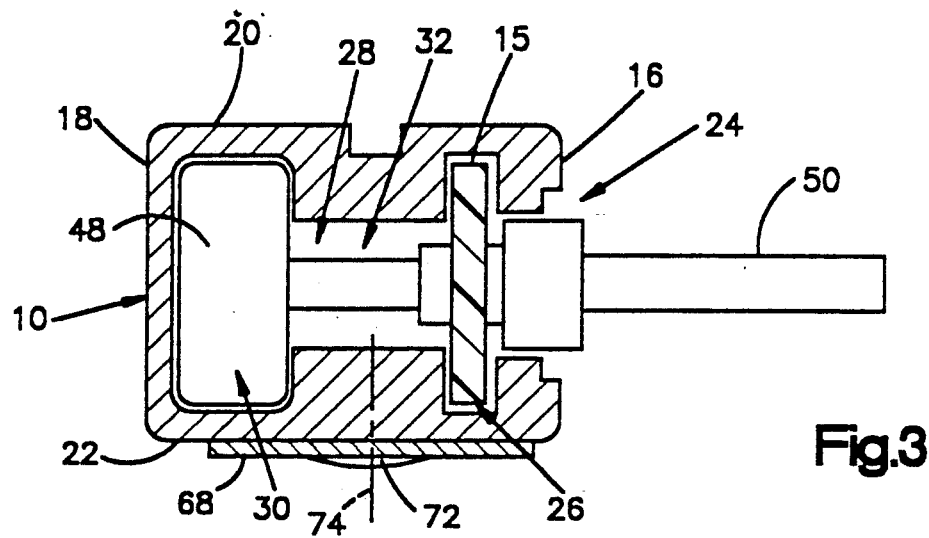
FIG. 3 is a sectional view taken on line 3—3 of FIG. 2.
Figure 4:
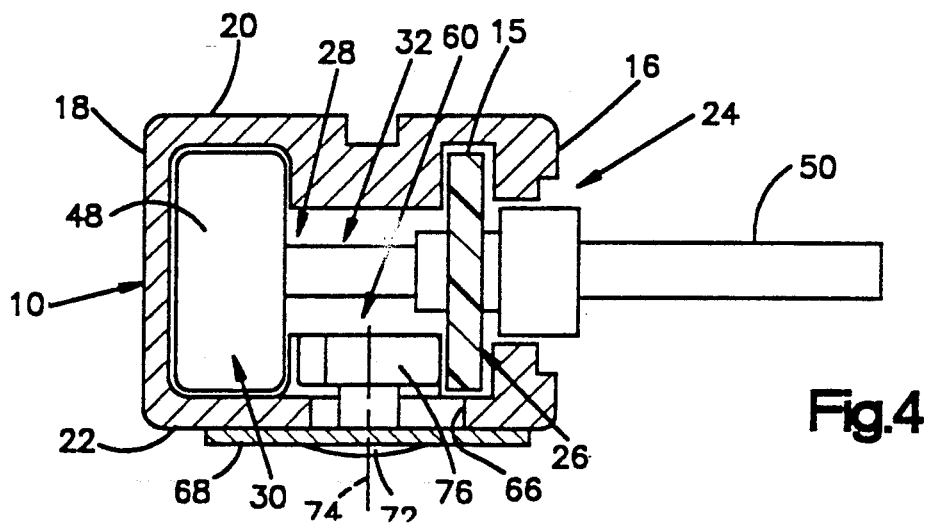
FIG. 4 is a sectional view taken on line 4—4 of FIG. 2.
Figure 2:
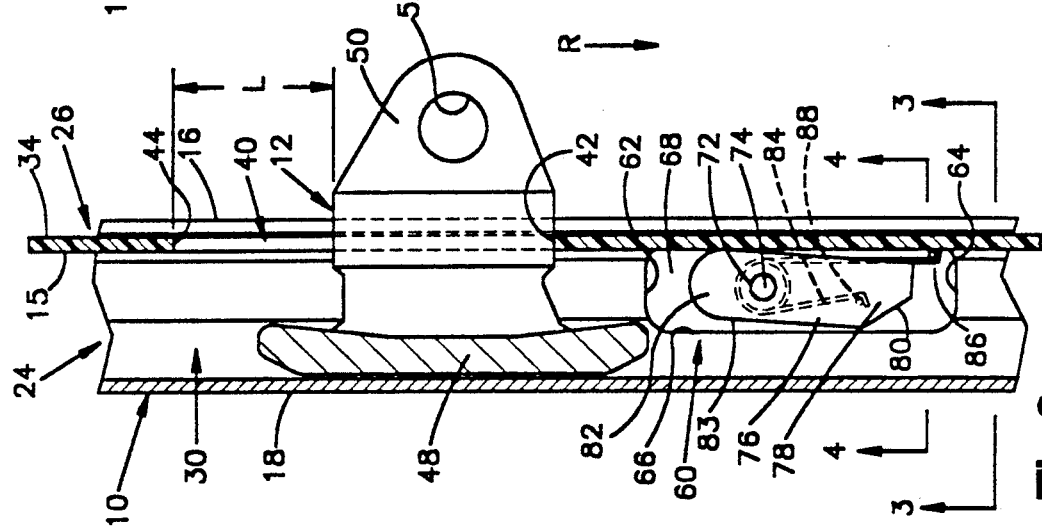
FIG. 2 is a sectional view of a portion of the passive seat belt system of FIG. 1 including emergency locking means in accordance with the present invention.
Figure 9:
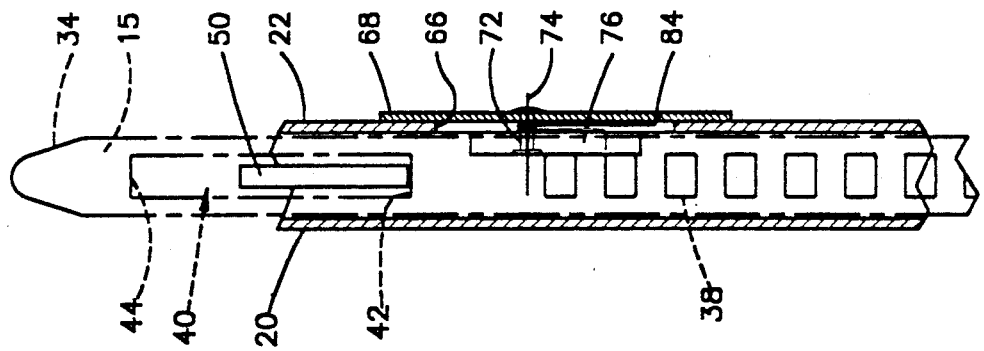
FIG. 9 is a sectional view of the emergency locking means in a position shifted from that shown in FIG. 8.

As shown in FIGS. 2-4, the track 10 comprises a front wall 16, a rear wall 18, opposite side walls 20 and 22, and an interior space including a channel 24 extending along the length of the track 10. The channel 24 comprises a tape guide portion 26 and a slider guide portion 28. The slider guide portion 28 includes a shoe receiving passageway 30 and a slot 32 communicating the shoe receiving passageway 30 with the tape guide portion 26 and the exterior of the track 10 at the front wall 16.

Figure 8:
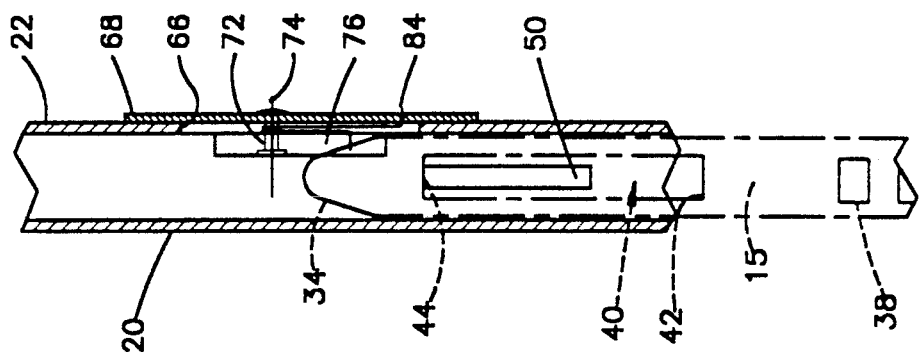
FIG. 8 is sectional view taken on line 8—8 of FIG. 7.

The tape 15 is received within the tape guide portion 26 of the channel 24. As shown in FIG. 8, the tape 15 comprises a tapered forward edge 34, a plurality of slotted holes 38 adapted for engagement with a driving member of the motor 11, and a tape opening 40 having a trailing edge 42 and a leading edge 44.

The slider 12 comprises a shoe 48 and an extension 50 having an aperture 52 for attachment of the seat belt 14 by conventional means. The shoe 48 slides within the shoe receiving passageway 30 of the channel 24, and the extension 50 extends outwardly from the slot 32 through the tape opening 40 in the tape 15. The distance between the trailing edge 42 and the leading edge 44 of the tape opening 40 exceeds the corresponding dimension of the extension 50 to provide a lost motion clearance L (shown in FIG. 2) through which the slider 12 and the tape 15 can move through the channel 24 relative one another.

The interior of the track 10 further includes an internal locking region 60. The internal locking region 60 has longitudinally opposite ends 62 and 64, and extends transversely across the track 10 between the front wall 16 and the rear wall 18 to communicate the shoe receiving passageway 30 of the channel 24 with the tape guide portion 26. An opening 66 in the side wall 22 of the track 10 provides access to the internal locking region 60. A closure wall 68 is releasably positioned over the access opening 66 by means of machine screws (not shown).

A mounting support hub in the form of a shaft 72 extends from the closure wall 68 into the internal locking region 60 on an axis 74 which extends transversely across the track 10. A lock bar 76 has a first end section 78 with a cam surface 80, a second end section 82, and an intermediate section 83. The lock bar 76 is pivotally mounted on the shaft 72 at the intermediate section 83 of the lock bar 76 for rotation about the transverse axis 74. A wire torsion spring 84 extends around the shaft 72 from a first spring hole 86 in the closure wall 68 to a second spring hole 88 in the lock bar 76 to bias the lock bar 76 about the transverse axis 74 in a clockwise direction as shown in FIG. 2.

Figure 6:
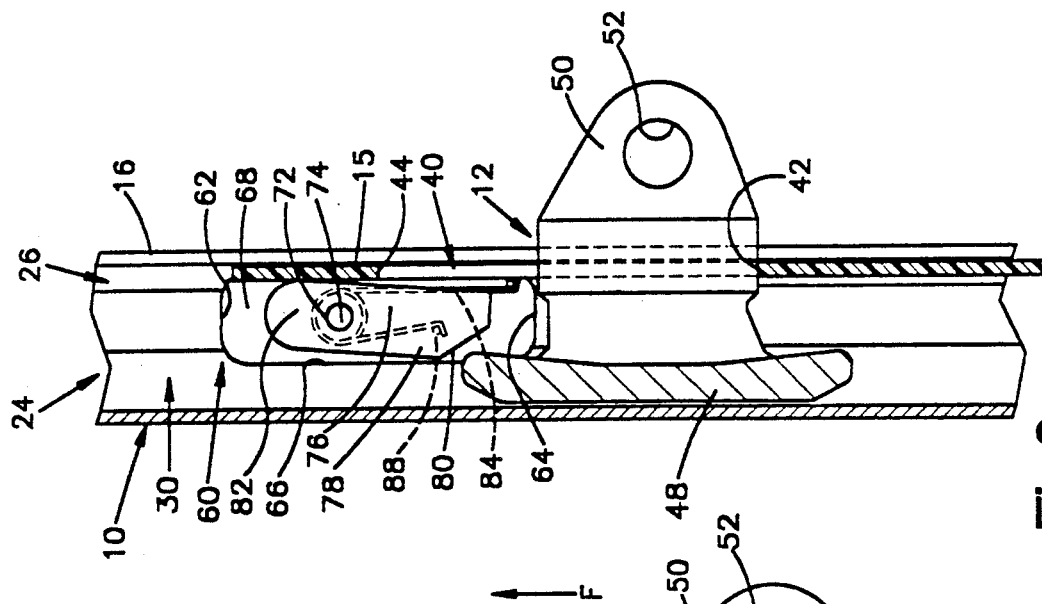
FIG. 6 is a sectional view of the emergency locking means in a position shifted from that shown in FIG. 5.
Figure 5:
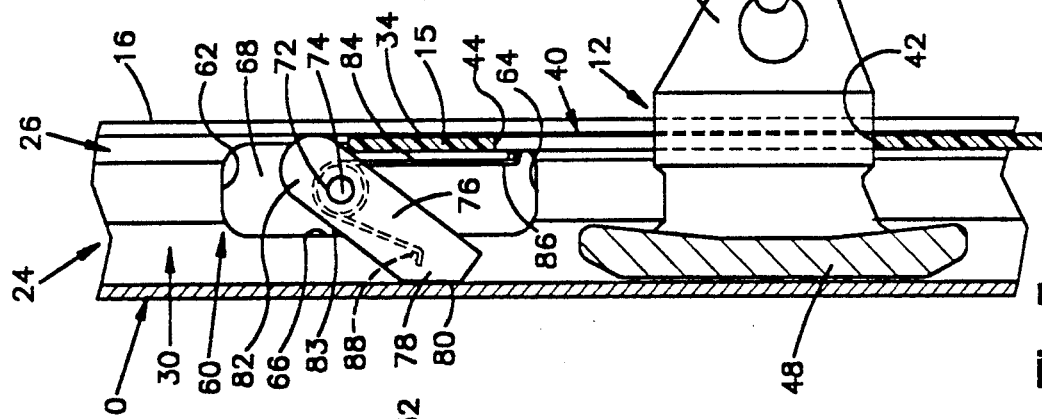
FIG. 5 is a sectional view of the emergency locking means in a position shifted from that shown in FIG. 2.

The lock bar 76 is rotatable about the transverse axis 74 between a first position shown in FIG. 5 and a second position shown in FIG. 6. When the lock bar 76 is in the first position, the first end section 78 of the lock bar 76 extends into the path of movement of the shoe 48 through the shoe receiving passageway 30, with the tapered edge 80 of the lock bar 76 abutting against the rear wall 18 of the track 10. The second end section 82 of the lock bar 76 extends into the path of movement of the tape 15 through the tape guide portion 26 of the channel 24 when the lock bar 76 is in the first position. When the lock bar 76 is in the second position, the first end section 78 of the lock bar 76 does not extend into the path of movement of the shoe 48, and the second end section 82 of the lock bar 76 does not extend into the path of movement of the tape 15.

The lock bar is moved between the first and second positions in operation of the passive seat belt system. When the slider 12 is located in the track 10 at a longitudinal position forward of the internal locking region 60 as shown in FIG. 2, the tape 15 will extend through the tape guide portion 26 of the channel 24 to hold the second end section 82 of the lock bar 76 out of the tape guide portion 26 and thereby will hold the lock bar 76 in the second position. As the slider 12 is carried with the driven tape 15 back toward the secured rear position of the system past the locking region 60 of the track 10, in the direction R shown in FIG. 2, the second position of the lock bar 76 permits passage of the shoe 48 through the shoe receiving passageway 30. To any extent that the flexible tape 15 does not hold the second end section 82 of pivotal lock bar 76 entirely out of the tape guide portion 26 of the channel 24, the rearwardly moving shoe 48 can further move the lock bar 76 toward the second position as it moves against the cam surface 80 in the direction R.

Figure 7:
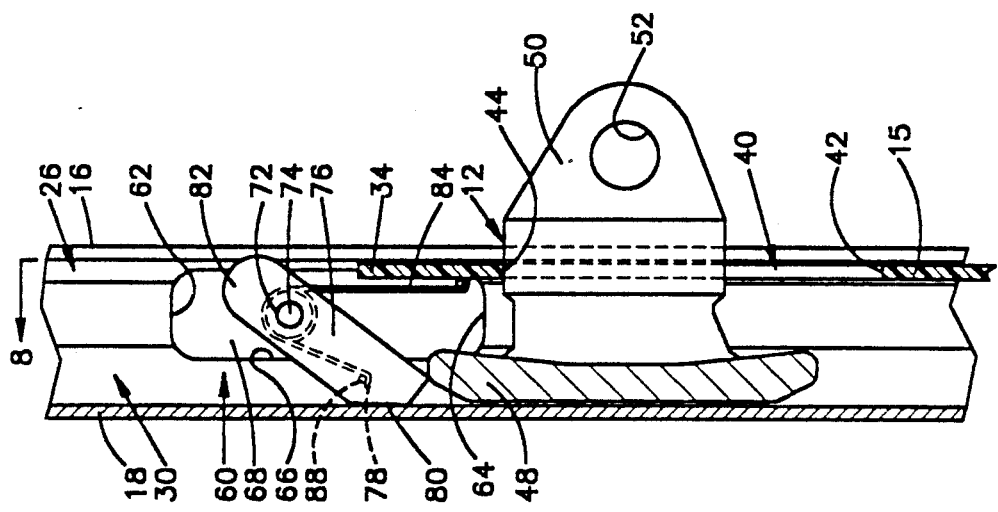
FIG. 7 is a sectional view of the emergency locking means in a position shifted from that shown in FIG. 6.

As the tape 15 is driven by the motor 11 to return toward the open forward position of the system in the direction F shown in FIG. 5, the extension 50 of the slider 12 will be carried by the trailing edge 42 of the tape opening 40. The lost motion clearance L (shown in FIG. 2) will enable the tapered forward edge 34 of the tape 15 to move against the second end section 82 of the lock bar 76 for movement of the lock bar 76 into the second position as shown in FIG. 6 before the shoe 48 reaches the lock bar 76. However, as shown in FIG. 7, the shoe 48 will be blocked against movement past the first end section 78 of the lock bar 76 if the shoe 48 is pulled forward through the lost motion clearance L relative to the tape 15. The lock bar 76 thereby prevents movement of the seat belt 14 out of the secured rear position in emergency situations which may pull the seat belt 14 and the slider 12 forward when the belt is not being driven by the motor 11.

In distinction to the prior art, the present invention does not consume valuable space available in a vehicle at the exterior of the track. Neither the lock bar 76, the pivotal mounting shaft 72, nor the spring 88 require a separate housing for support at the outside of the track 10. The portion of the passive seat belt system which supports those components can therefore extend within a B-pillar of the vehicle without interfering with the size or contour of the B-pillar, or could be located at a position outside of the B-pillar without requiring any more space than is required for the track alone.

An alternate passive seat belt system embodying the present invention is shown in FIGS. 10-12. An alternate lock bar 100 has a first end section 102 with a cam surface 104, a second end section 106, and a side wall portion 108. An integrally-formed mounting hub 110 extends outwardly from the side wall portion 108 on an axis 112 which is perpendicular to the side wall portion 108. The mounting hub 110 comprises a first cylindrical hub section 114, and a second cylindrical hub section 116 with a diameter less than the diameter of the first cylindrical hub section 114. A spring hole 118 extends radially through the second cylindrical hub section 116.

The alternate lock bar 100 is mounted to a closure plate 120 as shown in FIGS. 11 and 12. The closure plate 120 has a spring hole 122, and a circular opening 124 with a diameter slightly greater than the diameter of the first cylindrical hub section 114 of the mounting hub 110. The first cylindrical hub section 114 is received in the circular opening 124 such that the side wall portion 108 of the alternate lock bar 100 abuts against the inside surface 126 of the closure plate 120. A washer 128 is received over the second cylindrical portion 116 of the mounting hub 110. A wire torsion spring 130 extends from the spring hole 122 in the closure plate 120 around the second cylindrical hub section 116, and through the spring hole 118 in the second cylindrical hub section 116. The wire torsion spring 130 holds the alternate lock bar 100 against the closure plate 120, and biases the alternate lock bar 100 to rotate with respect to the closure plate 120 about the axis 112 in a clockwise direction as shown in FIG. 12. The closure plate 120 is securely fastened to the side wall 22 of the track 10 by machine screws 132 to support the alternate lock bar 100 in the internal locking region 60 of the track 10. The alternate lock bar 100 is rotatable about the axis 112 to be shiftable into and out of positions extending into the paths of movement of the slider 12 and the flexible tape 15 such that the alternate passive seat belt system shown in FIGS. 10-12 operates in the same manner as the first described passive seat belt system shown in FIGS. 1-9.

The invention has been described with reference to the preferred embodiments. However, alterations and modifications in the preferred embodiments will become apparent to those skilled in the art upon reading and understanding the specification. For example, a slight protrusion of the second end section 82 or 106 of either lock bar 76 or 100 outwardly through the slot 32 when the lock bar 76 or 100 is in the first position would not depart from the scope of the invention, since the lock bars 76 and 100 are both supported at a position which does not require a housing at the exterior of the track 10. Also, while the drawings show embodiments of a passive shoulder belt system, the invention is also applicable to a passive lap belt system. All such alterations and modifications are considered to come within the scope of the invention as set forth in the appended claims.

I claim:

1. A passive seat belt system comprising:
   an elongated track having a longitudinally extending channel;
   a slider movable through said channel and having means for attachment of a seat belt;
   a tape movable of a seat belt;
   a tape movable through said channel and having means for attachment to said slider to move said slider with said tape;
   a lock bar movable between a first position extending into the paths of movement of said slider and said tape in said channel, and a second position not extending into said paths of movement; and
   mounting means for mounting said lock bar in said track, with said lock bar being located entirely within said track when in said second position.

2. A passive seat belt system as defined in claim 1 wherein said lock bar is located entirely within said track when in both said first and second positions.

3. A passive seat belt system as defined in claim 2 wherein said mounting means comprises a mounting support hub having an axis, said lock bar being an elongated member having an intermediate section connected to said hub for said lock bar to be rotatable about said axis, and having first and second opposite end sections on opposite sides of said axis.

4. A passive seat belt system comprising:
an elongated track having a longitudinal extending channel;
a slider movable through said channel and having means for attachment of a seat belt;
a lock bar movable between a first position extending into the path of movement of said slider in said channel and a second position not extending into said path of movement, said lock bar having a first end section, a second end section, and an intermediate section; and
mounting means for mounting said lock bar in said track with said lock bar being located entirely within said track when in both said first and second positions, said mounting means comprising a mounting support hub having an axis, said hub being connected to said intermediate section of said lock bar to support said lock bar for rotation about said axis.

5. A passive seat belt system as defined in claim 4 further comprising a tape movable through said channel and having means for engagement with said slider to move said slider along said channel with said tape;
said lock bar having, when in said first position, said first end section extending into said path of movement of said slider and said second end section extending into the path of movement of said tape; and
said tape including one therefore, edge section for engagement with said second end section of said lock bar to move said lock bar into said second position.

6. A passive seat belt system as defined in claim 5 wherein said axis of said hub extends transversely across the width of said tape.

7. A passive seat belt system as defined in claim 5 wherein said channel includes a tape guide portion and a slider guide portion, said slider guide portion comprising a shoe receiving passageway and a slot communicating said shoe receiving passageway with the exterior of said track;
said slider comprises a shoe movable through said shoe receiving passageway and an extension movable through said slot;
said track includes an internal locking region communicating said shoe receiving passageway with said tape guide portion;
said lock bar is located in said internal locking region; and
said first end section of said lock bar extends into said slider guide portion of said channel and said second end section of said lock bar extends into said tape guide portion of said channel when said lock bar is in said first position.

8. A passive seat belt system as defined in claim 7 wherein said first end section of said lock bar extends into said shoe receiving passageway when said lock bar is in said first position.

9. A passive seat belt system as defined in claim 8 wherein said track includes a side wall with an opening communicating said internal locking region with the exterior of said track, and a closure wall releasably securable over said opening; and
said lock bar and said mounting support hub are supported by said closure wall.

10. A passive seat belt system as defined in claim 9 wherein said mounting support hub extends into said internal locking region from said closure wall.

11. A passive seat belt system as defined in claim 10 further including spring means acting between said closure wall and said lock bar to bias said lock bar toward said first position.

12. A passive seat belt system as defined in claim 9 wherein said closure wall has an opening, and said mounting support hub extends through said opening to the exterior of said track.

13. A passive seat belt system as defined in claim 12 wherein said mounting support hub is rotatable about said axis in said opening, said lock bar is connected to said hub to rotate with said hub, and further including spring means acting between said closure wall and said hub to bias said hub to rotate said lock bar toward said first position.

14. A passive seat belt system comprising:
an elongated track having an interior space including a longitudinally extending channel;
a slider movable through said channel;
a tape movable through said channel and having means for engagement with said slider to move said slider through said channel with said tape;
a lock bar having a first end section, an intermediate section, and a second end section; and
means for mounting said lock bar entirely within said interior space of said track with said end sections of said lock bar being pivotal about said intermediate section into and out of a position with said first end section extending into the path of movement of said slider and said second end section extending into the path of movement of said tape.

* * * * *

UNITED STATES PATENT AND TRADEMARK OFFICE
CERTIFICATE OF CORRECTION

PATENT NO.   : 5,071,165
DATED        : December 10, 1991
INVENTOR(S)  : Louis R. Brown It is certified that error appears in the above-identified patent and that said Letters Patent is hereby corrected as shown below:

Column 6, Line 50, Claim 1, delete "a tape movable of a seat belt;".

Column 7, Line 4, Claim 4, change "longitudinal" to --longitudinally--.

Line 31, Claim 5, delete "one therefore," and insert --an--.

Signed and Sealed this

Thirtieth Day of March, 1993

Attest:

STEPHEN G. KUNIN

Attesting Officer

Acting Commissioner of Patents and Trademarks